May 26, 1936.                E. O. P. THEGE                 2,041,979
            MEANS FOR ANCHORING CYLINDERS IN ENGINES
                 WITH ANGULARLY DISPOSED CYLINDERS
                      Filed July 31, 1934          2 Sheets-Sheet 1
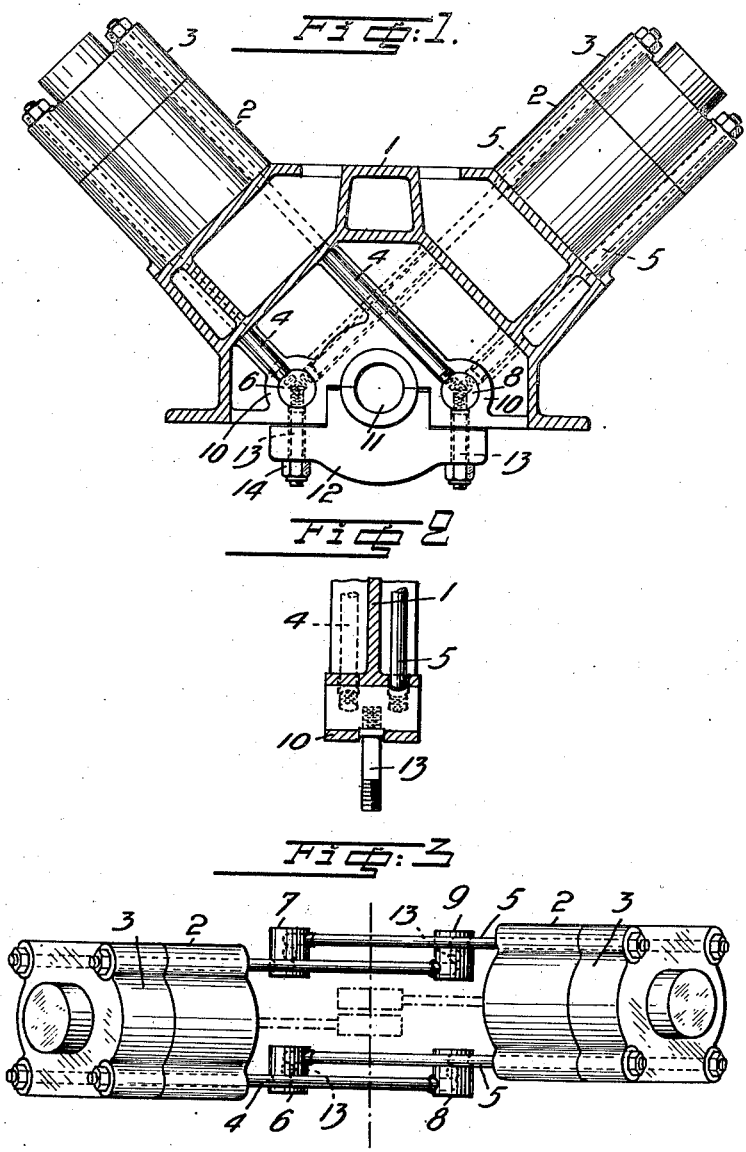

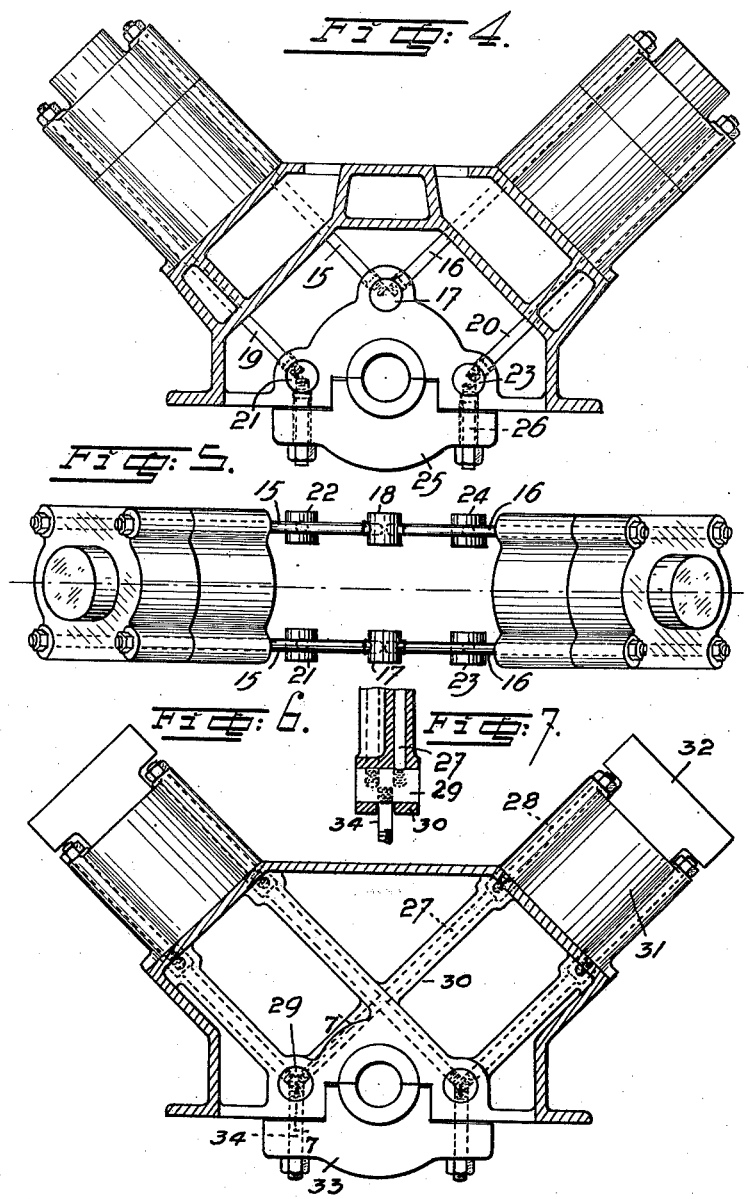

Patented May 26, 1936

2,041,979

UNITED STATES PATENT OFFICE 2,041,979

MEANS FOR ANCHORING CYLINDERS IN ENGINES WITH ANGULARLY DISPOSED CYLINDERS

Edvin Ossian Parcival Thege, Stockholm, Sweden, assignor to Aktiebolaget Atlas Diesel, Stockholm, Sweden, a corporation of Sweden Application July 31, 1934, Serial No. 737,750
In Sweden August 14, 1933

11 Claims. (Cl. 121—194)

The present invention relates to engines, particularly internal combustion engines, of the type in which the working cylinders are angularly disposed or inclined with respect to each other, and has particular reference to means for anchoring such cylinders to the frame of the engine.

For the purposes of the present specification and the appended claims, the term cylinder is used generically to designate cylinders with integral or detachable cylinder heads, and the anchor bolts hereinafter referred to will refer generically to bolts for retaining either cylinder barrels alone or cylinder barrels and heads.

A general object of the invention is to improve upon prior forms of cylinder anchoring means for engines of the above described kind.

In accordance with the invention, anchor members which may advantageously be in the form of blocks or bolts situated transversely of the cylinder axes are mounted in the frame of the engine, to which anchor members the cylinder anchor bolts are secured in a particular manner to be hereinafter more fully described.

In applying the invention to engines in which the axes of the working cylinders are offset sidewise with respect to one another, two cylinder anchor bolts may be fixed to the same anchor member, the longer anchor bolts of one cylinder crossing the longer anchor bolts of the second cylinder of one pair of cylinders inclined with respect to each other.

If the invention is used with engines in which pairs of relatively inclined cylinders are located with their axes in the same vertical transverse plane, the upper anchor bolts for each pair of cylinders may be fixed in pairs to the same anchor member while the remaining anchor bolts are each fixed to separate anchor members. Certain of the anchor members may have secured to them the bolts which with suitable holding nuts act to retain the lower bearing caps of the bearings for the crank shaft of the engine.

In accordance with one form of the invention, the cylinder anchor bolts may be divided into two parts, the inner parts being secured to the anchor members together with which they are cast in the material of the engine frame, while the outer parts of the anchor bolts holding the cylinders are screwed or otherwise secured to the outer ends of such inner parts.

For a better understanding of the detailed nature of the invention and the advantages to be derived from its use, reference may best be had to the ensuing description of the embodiments of the invention illustrated in the accompanying drawings forming a part of this specification.

In the drawings:

Fig. 1 is an elevation, partly in section, of an engine with inclined and laterally offset cylinders secured in accordance with the invention;

Fig. 2 is a detail on larger scale of part of the structure shown in Fig. 1;

Fig. 3 is a plan view of part of the engine shown in Fig. 1;

Fig. 4 is a view similar to Fig. 1 showing an engine with cylinders in the same transverse plane and embodying the invention;

Fig. 5 is a view similar to Fig. 3 of the engine shown in Fig. 4;

Fig. 6 is a view similar to Fig. 1 showing an engine with laterally offset cylinders and with divided anchor bolts; and Fig. 7 is a section taken on the line 7—7 of Fig. 6.

Referring now to Figs. 1 to 3, reference character 1 designates the frame of the engine, which may be of any suitable form, usually cast, and 2 designates the working cylinders with separate cylinder heads 3. The cylinder anchor bolts are indicated at 4 and 5. These bolts are anchored to anchor members 6, 7, 8 and 9, which in the embodiment illustrated are in the form of short transverse blocks or bolts mounted in the portions 10 of the engine frame.

As will be observed from the figures, the anchor members 6 and 7 are located at one side of the crank shaft (not shown) of the engine, the crank shaft bearing being indicated at 11, while the remaining anchor members 8 and 9 are located on the opposite side of the crank shaft. The location of the anchor members is such that the two short anchor bolts 4 for the left hand cylinder 2 may be screwed or otherwise secured to members 6 and 7 located to the left of the crank shaft and nearest to the left hand cylinder, while the two long anchor bolts 4 for the left hand cylinder may be suitably secured to the anchor members 8 and 9 on the opposite side of the shaft. Similarly, the two short anchor bolts 5 for the second or right hand cylinder 2 are secured to the nearest anchor members 8 and 9 on the right hand side of the shaft and the two long anchor bolts 5 are secured to the anchor members 6 and 7 on the left hand side of the shaft.

As will be clearly observed from the figures, the long anchor bolts 4 and 5 cross each other, this arrangement being possible because of the lateral offsetting of the cylinders 2 with respect to each other.

In this embodiment the lower bearing cap 12 of the crank shaft main bearing is also anchored to the anchor members by means of bolts or studs 13 secured to the anchor members, the bearing cap being retained by means of nuts 14.

In the embodiment shown in Figs. 4 and 5, in which the working cylinders are located in the same transverse vertical plane, the two upper or short anchor bolts 15 for the left hand cylinder are secured respectively to anchor members 17 and 18, and the corresponding cylinder anchor bolts 16 for the right hand cylinder are secured respectively to the same anchor members. The lower or longer anchor bolts 19 for the left hand cylinder are secured respectively to anchor members 21 and 22, while the corresponding cylinder anchor bolts 20 of the right hand cylinder are secured respectively to anchor members 23 and 24. In this embodiment, as in the one previously described, the crank shaft bearing cap may be anchored to the anchor members, and in Fig. 4 this construction is indicated for the cap 25, which is held in position by the bolts or studs 26 secured to the anchor members 21 and 23, and the retaining nuts associated with the bolts.

In the embodiment shown in Figs. 6 and 7, the construction is in general similar to that shown in Fig. 1, with respect to the location and arrangement of the anchor members and cylinder anchor bolts. In the present embodiment, however, the anchor bolts are divided into inner and outer parts, as indicated at 27 and 28. The inner part 27 of each cylinder anchor bolt is secured to an anchor member such as anchor member 29 and together with the anchor member is cast in the material of the engine frame. The bolt part 27, which advantageously extends to the outer surface of the frame, is preferably enlarged at its outer end and provided with a screw-threaded socket into which the outer bolt part 28, which anchors the cylinder 31, is screwed. In the embodiment shown in this figure the cylinder heads 32 have been indicated as detachable and also the cylinder anchor bolts have been indicated as anchoring only the cylinder blocks or barrels, the heads 32 being separately secured to the blocks or barrels by any suitable and well known means. Also, as indicated in the figure, the bearing cap 33 is anchored to the anchor members by means of bolts 34.

From the foregoing it will be evident that a construction according to the present invention provides an advantageous mounting for all cylinder anchor bolts as well as for the bearing cap bolts. The frame portions or castings 10 for the anchor members are easily obtained in a frame casting, and the anchor members may easily be inserted or cast in such casting.

While for the sake of simplicity only two engine cylinders have been shown in the various embodiments, and such portions of the engine as are not essential to an understanding of the invention have been omitted, it will be understood that the invention is applicable to multiple cylinder engines in which a larger number of cylinders are arranged in a series of relatively inclined banks. Also, while screw-threaded connections are indicated between the various anchoring parts with which the invention is concerned, it will be apparent that other methods of attachment, such, for example, as riveting or welding, may be employed if desired. Ordinarily the anchor members are made of soft steel or other suitable material having greater strength and being better adapted for strong connection between them and the anchor bolts than the cast metal of which engine frames are usually made.

It will further be understood that the specific forms of construction shown herein by way of example may be varied without departing from the spirit or scope of the invention as defined in the appended claims.

I claim:

1. In an engine having cylinders inclined with respect to each other, a frame, a plurality of separate anchor members located in the frame, and cylinder anchor bolts secured to said anchor members, at least two of the anchor members for a pair of oppositely inclined cylinders each having secured thereto a cylinder anchor bolt for each of the cylinders of the pair.

2. In an engine having cylinders inclined with respect to each other, a frame, a plurality of separate anchor members located in the frame, and cylinder anchor bolts secured to said anchor members, there being a plurality of anchor bolts at each side of a pair of oppositely inclined cylinders and at least two such anchor bolts associated with oppositely inclined cylinders being secured to one and the same anchor member.

3. In an engine having a pair of oppositely inclined cylinders, a frame providing a crank shaft bearing, an anchor member located in the frame to one side of said bearing, and at least two cylinder anchor bolts secured to said anchor member, one of said bolts being associated with one of said pair of cylinders and the other of said bolts being associated with the other of said pair of cylinders.

4. In an internal combustion engine having a pair of oppositely inclined cylinders, a frame providing a crank shaft bearing, a plurality of separate anchor members located in said frame on opposite sides of said bearing, each of said anchor members having secured thereto a plurality of cylinder anchor bolts and the anchor bolts secured to each of said anchor members including bolts associated with oppositely inclined cylinders.

5. In an engine having a pair of oppositely inclined and laterally offset cylinders, a frame providing a crank shaft bearing, a plurality of anchor members located in said frame at opposite sides of said bearing, long anchor bolts for one of said cylinders secured to anchor members located on the side of said bearing opposite the cylinder, short anchor bolts for the same cylinder secured to anchor members on the same side of said bearing as the cylinder, and corresponding long and short anchor bolts for the other of said cylinders correspondingly secured to the anchor members to which the anchor bolts for the first mentioned cylinder are secured.

6. In an engine having a pair of oppositely inclined and laterally offset cylinders, a frame providing a crank shaft bearing, a plurality of anchor members located in said frame at opposite sides of said bearing, a pair of short anchor bolts for each of said cylinders secured to anchor members located to the side of said bearing adjacent the respective cylinders, a pair of long anchor bolts for each cylinder secured to anchor members located to the side of said bearing remote from the respective cylinders, the long anchor bolts for each cylinder being secured to the same anchor members to which the short anchor bolts for the other cylinder are secured.

7. In an engine having a pair of oppositely inclined and laterally offset cylinders, a frame providing a crank shaft bearing having a detachable bearing cap, an anchor member located in the frame to one side of said bearing, an anchor bolt associated with each of said oppositely inclined cylinders secured to said anchor member, and a retaining bolt for said bearing cap secured to said anchor member.

8. In an engine having a pair of oppositely inclined and laterally offset cylinders, a frame providing a crank shaft bearing having a detachable bearing cap, a pair of anchor members including an anchor member located at each side of said bearing, each of said anchor members having secured thereto an anchor bolt associated with each of said pair of cylinders and each of said anchor members having secured thereto a retaining bolt for said bearing cap.

9. In an engine having a pair of oppositely inclined cylinders with axes located in the same transverse plane, a frame, a plurality of pairs of anchor members located in the frame, each of said pairs of anchor members having secured thereto anchor bolts for one of said cylinders and each of one of said pairs of anchor members having secured thereto anchor bolts for both of said cylinders.

10. In an engine having a pair of oppositely inclined cylinders with axes located in the same transverse plane, a frame, a plurality of anchor members located in the frame, upper anchor bolts and lower anchor bolts for each cylinder of the pair, corresponding upper anchor bolts for each cylinder being secured to the same anchor member, and corresponding lower anchor bolts for each cylinder being secured to separate anchor members.

11. In an engine having a pair of oppositely inclined cylinders with axes located in the same transverse plane, a frame providing a crank shaft bearing having a detachable cap, a plurality of anchor members located in said frame, upper anchor bolts and lower anchor bolts for each cylinder, corresponding upper anchor bolts for each cylinder being secured to the same anchor member and corresponding lower anchor bolts for each cylinder being secured to different anchor members, and retaining bolts for said bearing cap secured to the last mentioned anchor members.

EDVIN OSSIAN PARCIVAL THEGE.